(12) United States Patent
Masino

(10) Patent No.: US 7,030,582 B2
(45) Date of Patent: Apr. 18, 2006

(54) DIGITAL ADAPTIVE SENSORLESS COMMUTATIONAL DRIVE CONTROLLER FOR A BRUSHLESS DC MOTOR

(75) Inventor: James E. Masino, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 53 days.

(21) Appl. No.: 10/680,769

(22) Filed: Oct. 7, 2003

(65) Prior Publication Data

US 2004/0070356 A1 Apr. 15, 2004

Related U.S. Application Data

(63) Continuation-in-part of application No. 10/170,960, filed on Jun. 13, 2002, now Pat. No. 6,901,212.

(51) Int. Cl.
*H02P 7/00* (2006.01)

(52) U.S. Cl. .................. 318/439; 318/254; 318/138; 318/434; 310/220

(58) Field of Classification Search .......... 318/254, 318/138, 439, 434; 310/220; 388/800, 801, 388/804, 809, 811
See application file for complete search history.

(56) References Cited

U.S. PATENT DOCUMENTS

| | | | | |
|---|---|---|---|---|
| 5,367,234 A | | 11/1994 | DiTucci ............... | 318/254 |
| 5,506,487 A | | 4/1996 | Young et al. ............ | 318/811 |
| 5,592,058 A | * | 1/1997 | Archer et al. ............ | 318/254 |
| 5,672,948 A | | 9/1997 | Cohen et al. ............ | 318/609 |
| 5,767,654 A | | 6/1998 | Menegoli et al. ......... | 318/811 |
| 5,796,231 A | | 8/1998 | Kyodo ................. | 318/608 |
| 5,798,623 A | * | 8/1998 | El-Sadi ................ | 318/254 |
| 5,838,127 A | * | 11/1998 | Young et al. ............ | 318/293 |
| 5,859,520 A | * | 1/1999 | Bourgeois et al. ........ | 318/805 |
| 5,909,095 A | | 6/1999 | Sakti et al. ............ | 318/254 |
| 5,936,365 A | | 8/1999 | Li et al. .............. | 318/439 |
| 5,952,798 A | | 9/1999 | Jones et al. ........... | 318/268 |
| 5,998,955 A | | 12/1999 | Nishioka .............. | 318/696 |
| 6,069,908 A | | 5/2000 | Yuen et al. ............ | 363/98 |
| 6,104,113 A | | 8/2000 | Beifus ................ | 310/68 |
| 6,107,763 A | | 8/2000 | Rossi ................. | 318/254 |

(Continued)

OTHER PUBLICATIONS

Product Specification Data TDA5142T, *Brushless DC Motor Drive Circuit*; Jun. 1994, Phillips Semiconductors (pp. 1–19).

Texas Instruments Application Report SPRA498, *Sensorless Speed Controlled Brushless DC Drive Using the TMS320C242 DSP Controller*; Dec. 1998 (pp. 1–17).

PCT International Search Report, PCT/US03/18539, Nov. 6, 2003, (3 pp.).

PCT Written Opinion, PCT/US03/18539, Mar. 12, 2004, (4 pp.).

*Primary Examiner*—Rita Leykin
(74) *Attorney, Agent, or Firm*—Conley Rose, P.C.

(57) ABSTRACT

Devices and methods for controlling brushless, sensorless DC motors are disclosed. In one embodiment, an electrical motor is provided with a rotor, a stator, and a semiconductor on insulator (SOI) application-specific integrated circuit (ASIC). The ASIC is configured to energize stator windings in a commutational sequence to drive the rotor. A motor controller embodiment is provided with a set of comparators and a clocked digital circuit. Each comparator determines a voltage polarity on a respective stator winding. The clocked digital circuit receives polarity signals from the comparators and detects zero crossings having an expected crossing direction, which are then used to determine a commutational sequence for energizing stator windings. A method embodiment is provided for driving DC motor windings. One method embodiment includes: receiving polarity signals, measuring intervals, and advancing a commutation state.

14 Claims, 12 Drawing Sheets

U.S. PATENT DOCUMENTS

| | | | |
|---|---|---|---|
| 6,215,261 B1 * | 4/2001 | Becerra | 318/254 |
| 6,421,258 B1 | 7/2002 | Soldavini et al. | 363/56.02 |
| 6,483,266 B1 | 11/2002 | Miyazaki et al. | 318/254 |
| 6,534,936 B1 * | 3/2003 | Messenger et al. | 318/254 |
| 6,560,056 B1 | 5/2003 | Ryan | 360/69 |
| 6,577,097 B1 | 6/2003 | Krefta et al. | 318/801 |
| 6,633,145 B1 | 10/2003 | Shao et al. | 318/254 |
| 6,646,397 B1 * | 11/2003 | Discenzo | 318/439 |
| 6,661,192 B1 | 12/2003 | Copeland | 318/439 |
| 2002/0027423 A1 | 3/2002 | White | 318/254 |
| 2003/0076060 A1 | 4/2003 | Colosky et al. | 318/254 |
| 2003/0085682 A1 | 5/2003 | Hussein | 318/599 |

\* cited by examiner

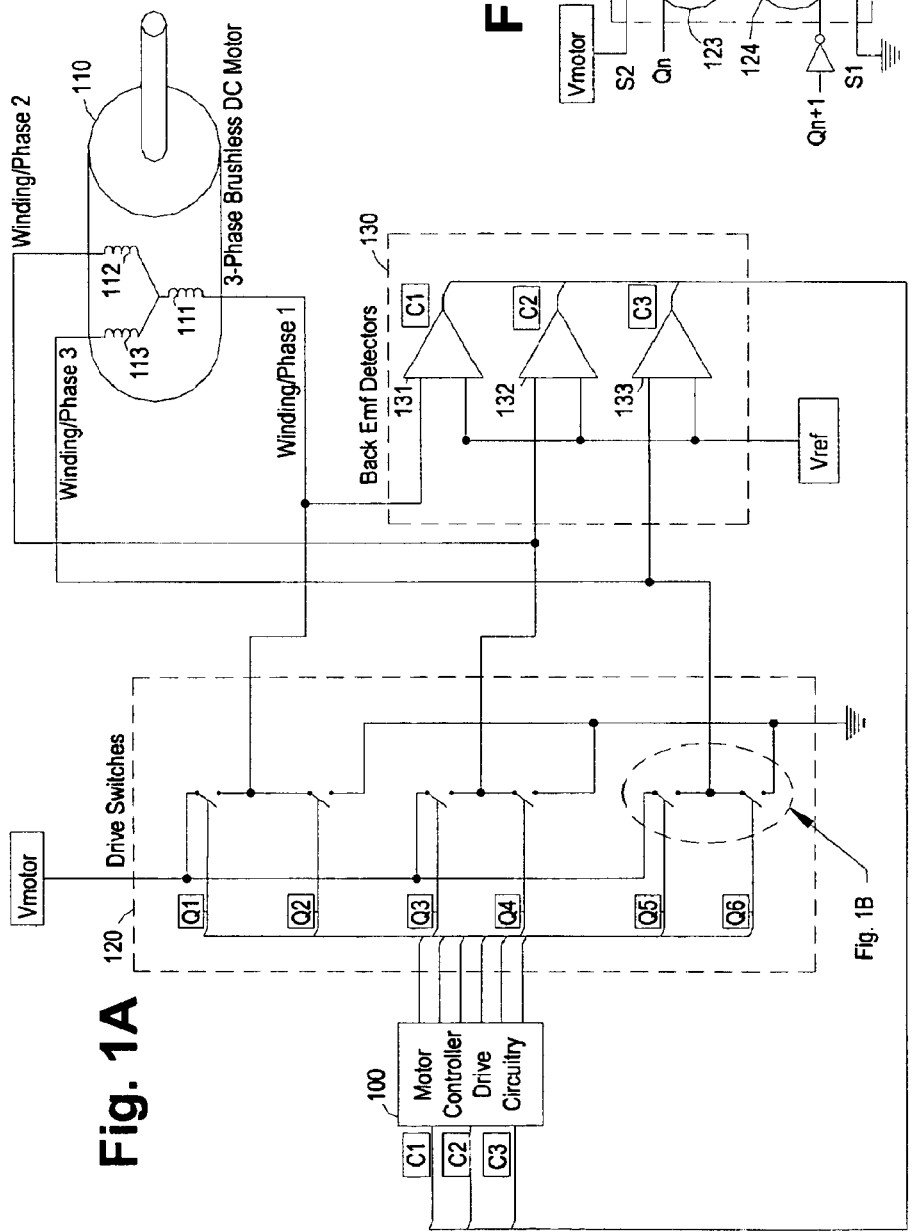

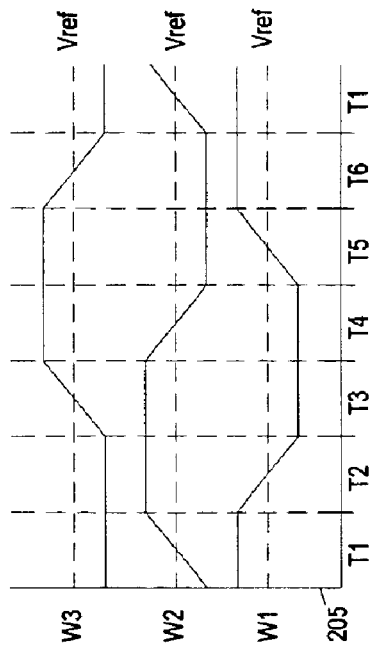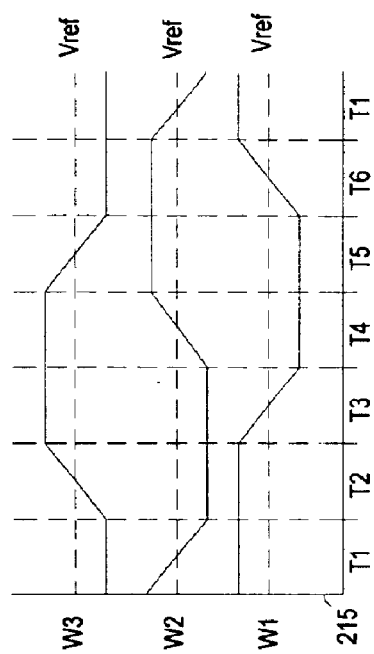
Fig. 2A
Fig. 2B

DIGITAL ADAPTIVE SENSORLESS COMMUTATIONAL DRIVE CONTROLLER FOR A BRUSHLESS DC MOTOR

CROSS-REFERENCE TO RELATED APPLICATIONS

This application is a continuation-in-part of U.S. patent application Ser. No. 10/170,960, titled Digital Adaptive Sensorless Commutational Drive Controller For A Brushless DC Motor, filed on Jun. 13, 2002 now U.S. Pat. No. 6,901,212 whose inventor is James E. Masino.

STATEMENT REGARDING FEDERALLY SPONSORED RESEARCH OR DEVELOPMENT

Not applicable.

BACKGROUND OF THE INVENTION

1. Field of the Invention

The present invention generally relates to brushless, sensorless, DC motor controllers. Specifically, the present invention relates to a completely digital logic implementation of a brushless, sensorless DC motor controller that uses back electromotive force values from the DC motor to selectively switch power to windings in the DC motor stator.

2. Background of the Invention

In conventional brushless DC motors, a displacing force (rotational or linear) is generated in the movable rotor portion of the motor by inducing a current in the stator windings. This stator winding current creates a stator magnetic field that causes the armature field in the motor rotor to attempt to align with the induced stator field. If a constant DC voltage is applied to a single coil or winding in a two-pole stator, the rotor will rotate and come to rest with the rotor poles aligned with the induced stator poles. To maintain rotor displacement, the current in the stator winding must be reversed to switch the polarity of the stator poles. If timed correctly, the momentum of the rotor and the switched magnetic field will act to keep the rotor turning.

Maximum torque is developed when the rotor field is normal to (90° ahead of) the stator field. If the polarity of a two-pole stator field is switched as the rotor armature field approaches alignment with the stator field, the rotor and stator fields can be as much as or over 180° apart. Thus, a simple DC motor comprising two stator poles will exhibit large torque variations as the rotor moves. Improvements to this basic, two-pole brushless DC motor model have been implemented by incorporating more stator coils, windings, and poles and a corresponding increase in rotor poles. Three-phase brushless motors are commonly used for this type of application because the separate phases of a three-phase power supply can be coupled to multiple stator windings to induce multiple stator poles. An increase in the number of stator poles in a DC motor offers the benefit of producing a more efficient motor. However, the additional poles also increase motor complexity because stator winding current must be switched on and off to keep the stator poles ahead of the rotor poles as the rotor moves with respect to the stator. This switching is often described as commutation, which refers to the synchronous regulation of stator and rotor magnetic fluxes.

At least two predominant approaches have been used to successfully implement this type of switching. Older, more conventional DC motors used a brush-commutator system to continuously switch drive current as the rotor moved. In these motors, motor voltage was applied via physical contact between the brushes and winding contacts on the rotor armature. These winding contacts are typically separated by gaps where the brush contacts do not contact any windings. Thus, as the rotor moves, the brush contacts lose contact with a first winding before making contact with a second winding. With this functionality, motive power can be applied to the armature windings in the correct sequence to maintain rotor motion. While effective, these brushes were subject to mechanical wear over time. Furthermore, this configuration added to the amount of hardware and wiring that was needed to successfully drive the motor.

As an alternative approach, brushless DC motors were subsequently developed to eliminate brush contacts. In these latter designs, the automatic switching effect provided by the brushes in older conventional motors had to be accounted for. To accomplish this, brushless DC motor controllers were developed to control the timing and switching of power delivery to the motor. In addition, the motor configuration is changed to move the switched windings from the rotor to the stator. Further, the permanent magnets are transferred to the rotor. In practice, the motor controllers incorporate feedback signals that provide the precise location of the rotor with respect to the stator at any given time. In conventional systems, this position information is provided using hall effect sensors, optical sensors, or synchro resolvers. Signals from these external sensors are fed back to the motor controller, which switches stator windings on and off (thereby moving the induced magnet field) based on the position of the rotor. These brushless DC motor solutions significantly reduced, if not eliminated, the conventional mechanical wear problem, but they still required extra hardware and wiring to provide the necessary position feedback.

Accordingly, another family of brushless DC motor controllers was developed that use back EMF signals generated by the motor windings to indicate rotor position. The motor configuration for these brushless, sensorless DC motors remains the same as the sensored, brushless DC motors. That is, the drive windings are located in the stator and the permanent magnets are disposed about the rotor.

It is well known to those skilled in the art that Faraday's Law necessitates that a moving magnetic flux in the presence of a conductor will induce a voltage in that conductor. This voltage is commonly referred to as electromotive force (EMF). The EMF phenomenon permits a permanent magnet DC motor to work as a generator. Thus, in a brushless, sensorless DC motor with multiple stator windings, a voltage naturally appears across the stator windings as the rotor moves. In the motor context (as distinguished from a generator), the EMF induced in the stator windings is a byproduct of the drive power supplied by the motor controller and power supply. As such, this EMF may be classified as Back EMF. The magnitude of this Back EMF changes as the permanent magnets move towards and away from the stator windings. As such, the magnitude of the Back EMF signal can be used to indicate position of the rotor. Various methods are used in the art to translate the Back EMF signal into a position indication, including comparators, accumulators, and perhaps even simple switches.

In practice, a brushless, sensorless DC motor will incorporate a plurality of stator windings and use a motor controller to synchronously switch power to the stator windings to induce motion in the rotor. A common configuration includes a stator with three windings and multiple rotor magnet poles. To induce motion in the rotor, two of the stator windings are driven, while the third winding is undriven, or essentially off. The Back EMF levels in the third winding can then be measured and used to identify the position of the rotor. As the motor controller switches power to the DC motor, the third winding will be turned on (driven) and one of the previously driven windings will be turned off. Naturally, the process repeats during normal motor operation.

The advent of brushless, sensorless DC motor controllers that use Back EMF signals to indicate rotor position has eliminated the need for commutator brushes, revolvers, and hall effect sensors to indicate the position of a rotor as it moves with respect to the stator. The Back EMF signals are incorporated into a feedback loop between the DC motor and the DC motor controller to correctly time the switching of power to the motor windings. Thus, the heart of the operation lies with the motor controller and any methods used by the controller to interpret the Back EMF signals to correctly time the switching events.

One problem with using Back EMF signals to indicate rotor position is that the rotor must be moving to generate any Back EMF signal at all. Thus, most conventional brushless, sensorless DC motor controllers incorporate some functionality to initiate rotor movement and thereby generate the required Back EMF signals.

Prior art brushless, sensorless DC motor controller devices exist in a variety of configurations. As brushless, sensorless DC motors become more prevalent, off-the-shelf motor controllers have become more common. As an example, Philips Semiconductors offers dedicated bipolar integrated circuits (IC) to drive three phase brushless DC motors. Similarly, Texas Instruments has proposed the use of a digital signal processor (DSP) to implement a software motor controller. These prior art solutions have been proven to work effectively in controlling DC motor commutation. However, there are a number of drawbacks and limitations to these prior art motor controllers.

First, any controllers that use bipolar technologies are limited to use in reasonable operating temperatures. Conventional bipolar devices can operate effectively up to about 70° C. In addition, some ICs require external energy storage devices such as capacitors to control critical timing. These additional devices also lack long-term reliability at elevated operating temperatures. Operating temperature range can also be prohibitive in processor designs, with 70° C. also being a typical maximum operating temperature for processors and DSPs. Military grade DSPs offer a maximum operating temperature in the 120°–130° C. range, but this may still limit applicability to high temperature (in excess of 150° C.) environments, such as those found in proximity to combustion engines or downhole drilling applications.

A second problem with prior art brushless, sensorless DC motor controllers is complexity and reliability. As mentioned above, ICs often require analog components to control commutational timing. These analog components tend to inhibit the long-term reliability of these designs. Other designs employing processors are even more complex and expensive. A typical DSP may include multiple processors, memory devices, and memory controllers and require software code to be written, debugged, and integrated before deployment. This complexity often hampers time to market. Further, it is generally accepted that designs that are more complex exhibit lower long-term reliability.

Therefore, a primary consideration in improving reliability is reducing complexity of the motor controller. Further, it is also desirable to create a fully digital embodiment of a brushless, sensorless DC motor controller such that the controller may be implemented on a single digital logic device. A fully digital embodiment may also permit incorporation onto a high temperature digital logic device, such as a semiconductor on insulator (SOI) device. SOI devices can incorporate digital logic components mounted onto a thin, single-crystal semiconductor film growing atop a synthetic insulator substrate. The insulator may be silicon oxide, glass, or sapphire. SOI devices were originally developed for use in military and aviation applications requiring high temperature and "radiation hardened" chips.

Thus, a simple, fully digital implementation of a brushless, sensorless DC motor controller offers distinct advantages over prior art designs. The improved digital design may be implemented on an off-the-shelf programmable logic device costing only a few dollars. Such a design may advantageously provide a low-cost, reliable alternative to existing controller designs for use at reasonable operating temperatures. In addition, the improved digital design may be implemented on SOI logic devices to provide a reliable, high-temperature motor controller solution that is not available with conventional controllers. Further, the new controller requires a single clock, the frequency of which may be adjusted to accommodate a range of BLDC motors. Existing controllers are often difficult to tune and may require the changing of analog components or program code.

It is therefore desirable to develop a fully digital embodiment of a brushless, sensorless DC motor controller that uses Back EMF feedback information from the DC motor to accurately commutate the DC motor. The motor controller preferably provides a simple, reliable alternative to conventional motor controllers. In addition to proper commutation, the improved motor controller should effectively account for startup conditions where Back EMF signals are not present. Further, the improved motor controller should advantageously adapt to varying input voltages and rotor velocities.

BRIEF SUMMARY OF THE INVENTION

Accordingly, there is disclosed herein various embodiments of an electrical motor, a brushless DC motor controller, and methods embodied therein. In one embodiment, the electrical motor includes a rotor, a stator, and a semiconductor on insulator (SOI) application-specific integrated circuit (ASIC). The rotor includes multiple magnetic poles. The stator includes multiple windings configurable to exert a torque on the rotor when energized in a commutational sequence. The ASIC is coupled to the windings of the stator and configured to apply the commutational sequence.

A brushless DC motor controller may in one embodiment include a set of comparators and a clocked digital circuit. The set of comparators are each configured to determine a voltage polarity on a respective winding of a stator. The clocked digital circuit is configured to receive polarity signals from the comparators and configured to detect in the polarity signals zero crossings having an expected crossing direction. The clocked digital circuit is also configured to determine a commutational sequence for energizing windings on the stator.

A method of driving windings in a DC motor is also provided. In one embodiment, the method includes receiving polarity signals, measuring intervals, and advancing a commutation state. The polarity signals may be received with a clocked digital circuit. The polarity signals are indicative of whether voltages on windings of the DC motor exceed a threshold voltage. The clocked digital circuit is configured to operate in temperatures exceeding 150° C. The intervals are between transitions of the polarity signals in predicted directions. The commutation state is advanced at a delay of some fraction of measured intervals after transitions of the polarity signals.

A method of applying a commutating sequence of voltages to windings of a DC motor is also provided. In one embodiment, the method includes obtaining a first sample of a polarity signal, advancing the commutating sequence, and obtaining a second sample of the polarity signal. The first sample of the polarity signal is indicative of whether a voltage on a winding of a DC motor exceed a threshold voltage. The second sample of the polarity signal is following a predetermined delay after advancing the commutating signal. The method also includes asserting a transition detection signal if the first and second samples are different. Otherwise, the method samples the polarity signal until a transition is detected and then asserts a transition detection signal. The method also includes advancing the commutating sequence following an adaptive delay after the asserting of the transition detection signal.

BRIEF DESCRIPTION OF THE DRAWINGS

For a detailed description of the preferred embodiments of the invention, reference will now be made to the accompanying drawings in which:

FIG. 1A shows a high level schematic representation of the preferred embodiment used as a motor controller in a feedback loop to drive a brushless, sensorless three-phase DC motor;

FIG. 1B shows a preferred brushless DC motor drive switch that may be used in conjunction with the preferred embodiment;

FIGS. 2A and 2B show a state table and theoretical timing diagram indicating the commutational switching of the various windings in a brushless, three-phase DC motor;

NOTATION AND NOMENCLATURE

Figure 3:
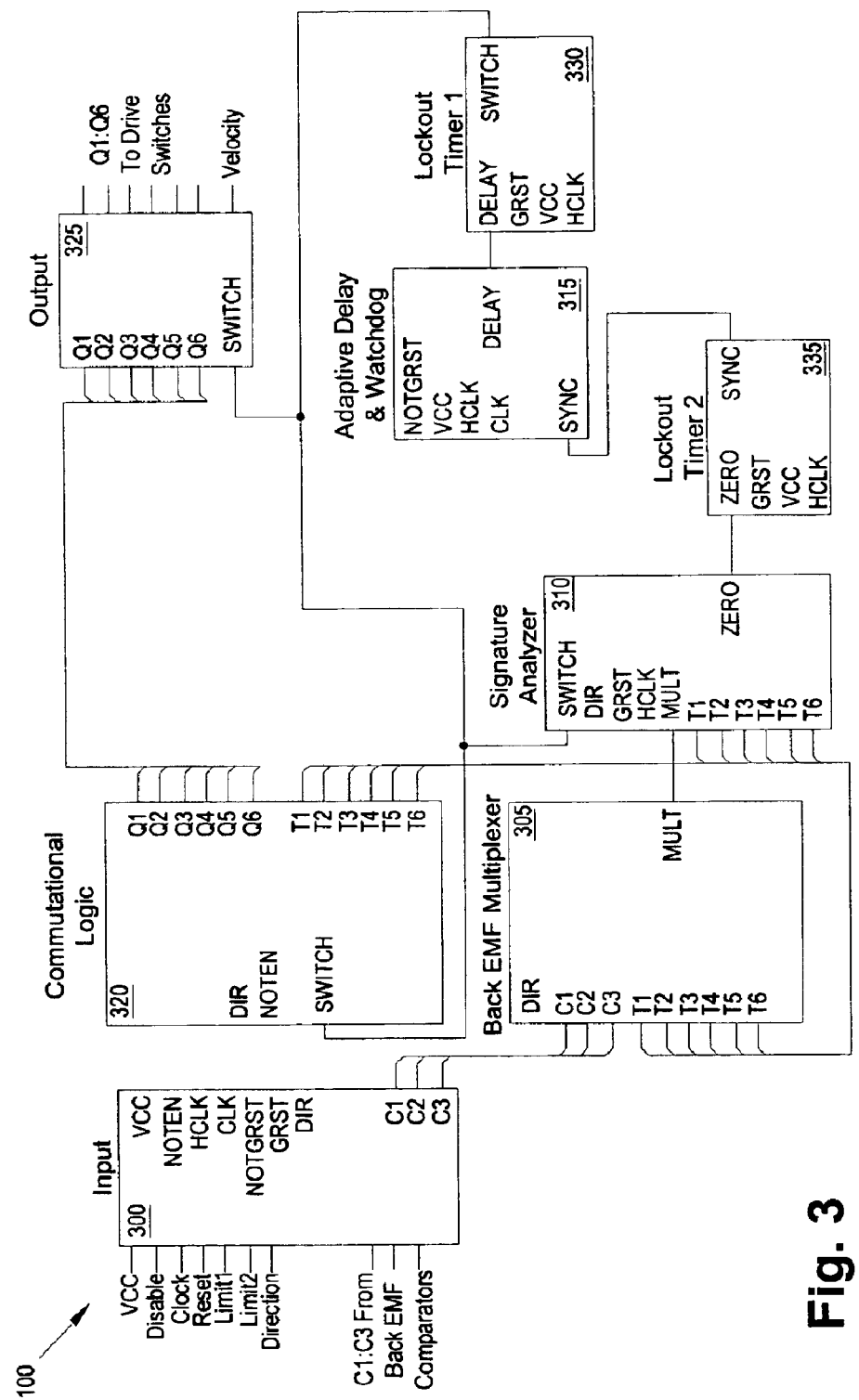
FIG. 3 shows a top-level schematic showing the interrelation of the various component circuitry in the preferred embodiment.

Certain terms are used throughout the following description and claims to refer to particular system components. As one skilled in the art will appreciate, one skilled in the art may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". In addition, the term "couple" or "couples" is intended to mean either an indirect or a direct connection. Thus, if a first device couples to a second device, that connection may be through a direct connection, or through an indirect electrical connection via other devices and connections.

Additionally, the description of the preferred embodiment makes used of the nomenclature "brushless, sensorless DC motor controller" to indicate that the motor controller drives a brushless DC motor and does not rely on external sensor devices to provide rotor position feedback.

Further, the state machine described herein in conjunction with the preferred embodiment tracks a plurality of states that may be referred to as commutational states or rotor position states. The term "rotor position" in this context refers to any of a plurality of rotor positions and rotations that correspond with a commutational state depending on the number of magnetic pole pairs in the rotor of the sensorless, brushless DC motor. Hence, "rotor position" is not intended to be an exclusively determinative phrase in this context.

DETAILED DESCRIPTION OF THE PREFERRED EMBODIMENTS

The preferred embodiment described herein generally discloses a digital motor controller drive circuit configured to provide commutation signals to a brushless, sensorless DC motor. The motor controller preferably resides in a feedback loop that comprises drive switches, commonly implemented using MOSFET switches, a three-phase brushless DC motor, and Back Electromotive Force (BEMF) detectors. The motor controller drive circuitry preferably receives digital signals from the BEMF detectors that indicate whether the voltage on the various windings are above a threshold and compares these levels with a previously detected level to determine whether the winding voltages are as expected. By expected, it is intended that the two levels—a presently detected level and the immediately prior detected level—are the same. If the voltage levels are as expected, the signature analyzer waits for a zero crossing before transmitting a commutation pulse. However, when the levels are different, the signature analyzer transmits a pulse that occurs at the end of the lockout time. The output signals from the preferred embodiment operate switches that control how and when power is delivered to the DC motor windings. The full scope of the preferred embodiment is described below in conjunction with related FIGS. 1–12.

Referring now to FIG. 1A, the schematic shown provides a high level representation of the preferred embodiment used as a motor controller 100 in a feedback loop to drive a brushless, sensorless three-phase DC motor 110. The feedback loop preferably comprises, at a minimum, the motor controller 100, the DC motor, a set of drive switches 120, and a set of Back EMF (BEMF) detectors 130. The drive switches 120 may be eliminated in favor of low power drive transistors embodied within the motor controller circuit in the case where the preferred motor controller is used to operate a low-power brushless DC motor. The BEMF detectors are preferably embodied as digital comparators 131–133 that transmit a binary output signal C1:C3, the value of which depends on the voltage level appearing on the DC motor windings. Each comparator 131–133 is preferably configured to compare the voltage level on one of the DC motor input windings 111–113 against a reference voltage, Vref. This reference voltage may be a static or variable voltage, but is generally regarded as roughly half the potential between a high drive voltage level and a low drive voltage level.

In driving a three-phase DC motor, it is common to apply a high voltage level to pull one of the windings high and to apply a low voltage level to push one of the windings low. This operation is sometimes referred to as a push-pull operation. The third winding is typically tristated, or turned off. In the preferred embodiment, it is envisioned that the high side voltage will be some motor voltage, Vmotor, and the low side voltage will simply be ground or zero voltage. Thus, the reference voltage used by the BEMF comparators 131–133 will be roughly half of Vmotor. In application, Vref may be supplied by a voltage divider from Vmotor or perhaps from a center tap from the DC motor 110. In either case, those skilled in the art will recognize that Vref represents a reference voltage level that can be used to locate "zero" crossings of the BEMF levels on tri-stated windings. In general, when a winding BEMF voltage is above Vref, the BEMF comparators 131–133 will output a logic high (1) signal. Conversely, when the BEMF voltage is below Vref, the BEMF comparators will output a logic low (0) signal. The opposite polarity will certainly work as well. The term zero crossing is therefore used to indicate the point at which a BEMF voltage crosses Vref.

The digital outputs C1:C3 from the BEMF detectors 130 (whether they be comparators, integrators, accumulators or otherwise) are preferably transmitted to the input of the preferred motor controller 100. The motor controller 100 processes these digital signals and determines the proper control signals Q1:Q6 to transmit to drive switches 120. As mentioned above, only two of the three windings on the three-phase brushless DC motor 110 are driven at any given moment. The third winding is turned off. Thus, the switch control signals Q1:Q6 control the position of the drive switches 120 to properly couple the windings 111–113 to Vmotor or to ground or to nothing at all.

In a preferred embodiment, the drive switches 120 are implemented using complementary power MOSFET switches 122 as shown in FIG. 1B. The preferred drive switch 122 as shown in FIG. 1B is preferably coupled to each winding on the motor. Each drive switch 122 includes two separate transistors. The first transistor 123 is used to couple the winding to a high voltage level (Vmotor in the preferred embodiment) and the second transistor 124 is used to couple the winding to a low voltage level (ground in the preferred embodiment). The transistor pair in the preferred embodiment is complementary. In other words, one transistor is a p-channel device 123 while the second transistor is an n-channel device 124. The n-channel device 124 conducts with a positive input gate voltage (logic high) while the p-channel device 123 conducts with a negative gate voltage (logic low). The preferred embodiment of the motor controller 100 generates switch control signals Q1:Q6 that are active low. Thus, in coupling the preferred motor controller 100 with the preferred drive switch 122, the even numbered switch control signals (Q2, Q4, Q6) must be inverted before the gate of transistor 124. When a winding is turned off, both transistors 123, 124 are turned off so that neither is conducting. The preferred embodiment is also configured to prevent both transistors 123, 124 from conducting at the same time. The state table and timing diagrams in FIGS. 2A and 2B are helpful to further understand the timing of the switch control logic signals Q1:Q6. Thus, the preferred embodiment can be easily configured to generate binary output signals Q1:Q6 that conform to the preferred type of drive switch 122. Those skilled in the art will recognize that it is a trivial task to adjust the logic circuit and invert the output signals to conform to drive switches that are any combination of n-channel or p-channel switches.

It should also be noted that in the event the output signals Q1:Q6 do not provide enough current or voltage to turn the drive switches on and off, an appropriate level converter may be incorporated into the design. Further, as indicated above, a low-power brushless DC motor may be driven by the preferred embodiment directly (i.e., without the aid of drive switches). Those skilled in the art will certainly recognize the appropriate modifications that must be made.

FIGS. 2A and 2B show a state table and theoretical timing diagram indicating the commutational switching of the various windings in a brushless, three-phase DC motor. The difference between the two figures is that FIG. 2A represents a rotor traveling in a first direction indicated by a logic 1 and FIG. 2B represents rotor motion in a second, opposite direction indicated by a logic 0. In accordance with the preferred embodiment, a commutational switching event occurs every 60° in a 360° period. Consequently, rotor position can be categorized into one of six possible states T1–T6. These six states can be represented by a minimum of three bits R1, R2, R3 as shown in the state tables 200, 210. The six states and their corresponding digital representations are the same regardless of rotor direction. The significance of the digital representations shown in the state tables 200, 210 as well as the unused representations (binary 101 and 010) will be discussed in further detail in conjunction with the description of the state machine shown in FIG. 5 below.

The state tables shown in FIGS. 2A and 2B include the winding voltage level and switch control logic signals Q1:Q6 for each individual state. For example, in state table 200 corresponding to rotor direction 1, state T3 (represented by binary 110) indicates that winding 1 (W1) should be pulled low or grounded and Winding 2 (W2) should be pulled high to Vmotor. By default, since W1 is low and W2 is high, W3 should be off. Consequently, the preferred embodiment looks to the BEMF levels on W3 to determine if the rotor is moving as expected. In this particular direction of rotor travel and in this particular state, T3, the BEMF level on W3 should start low and rise (R) above Vref.

The timing diagram 205 shows a qualitative representation of the winding voltage levels W1–W3 during each state T1–T6. The horizontal lines in the timing diagrams represent Vref for each winding. Thus, in state T3 of timing diagram 205, W1 is shown below Vref (Low), W1 is shown above Vref (High), and W3 is shown rising from a low state to a high state. Consequently, the BEMF detector output signal C3 (from FIG. 1A) should indicate a low to hi transition somewhere in state T3. State table 210 and timing diagram 215 are equivalent representations for the opposite rotor direction 0.

A few items should be noted for clarity and understanding. In the preferred embodiment, the winding voltage signals lag each other by 120°. In direction 1, winding 2 lags winding 1 by 120° and winding 3 lags winding 2 by 120°. However, in direction 0, the timing of windings 2 and 3 are reversed such that winding 3 lags winding 1 by 120° and winding 2 lags winding 3 by 120°. Further, for any single 360° period, each winding will be pulled high for two states, fall for one state, be pulled low for two states, and rise again for one state. The process then repeats for steady state rotor travel in a single direction.

Referring now to FIG. 3, the schematic shown provides a top-level description of the interrelation of the various component circuitries in the preferred motor controller 100. The preferred embodiment of the motor controller 100 may be broken down into sub-circuits or components according to function. As FIG. 3 shows, the preferred embodiment includes an input circuit 300, a BEMF Multiplexer 305, a Signature Analyzer 310, and Adaptive Delay and Watchdog 315, Commutational Logic 320 and an output circuit 325. The preferred embodiment of the motor controller 100 also includes two separate lockout timers 330, 335. Lockout timer 335 serves to improve reliability and robustness of the motor controller 100. As such, it may be considered a nonessential component, but is certainly a desirable portion of the preferred embodiment. Thus, an operational alternative embodiment may be implemented with only the lockout timer 330 while omitting lockout timer 335.

As FIG. 1 showed, the preferred motor controller 100 received input signals C1:C3 from the Back EMF comparators 131–133. In addition, the output from the preferred motor controller 100 includes the drive switch signals Q1:Q6. The motor controller 100 preferably interprets the comparator signals C1:C3 in light of control signals to generate the proper output signals Q1:Q6. These control signals are shown in more detail in FIG. 4, which shows a logic schematic of the input circuit 300.

The control signals that are used to control operation of the motor controller 100 include a logic supply voltage VCC, which may be a standard 5V, 3.3V or other level as needed to turn on components in the motor controller 100. A DISABLE signal is also provided as a coast signal. Others skilled in the art will see alternative ways of disabling the motor such as implementing a brake signal or both a brake signal and coast signals together. A standard clock signal, CLK is also provided to control the timing of certain events. These events and a calculation of an appropriate clock frequency are described in more detail below. A RESET signal is also provided to clear all necessary logic devices within the preferred embodiment and provide a starting point for motor operation. In practice, the preferred motor controller is robust enough that the reset signal should rarely be needed. However, it may be provided as a safeguard. The preferred embodiment uses a DIRECTION signal to control the direction of rotor travel. Lastly, the motor controller 100 can also be fed LIMIT signals (1 and 2) that serve to disable rotor motion when mechanical or electrical limits are reached. For example, one limit may correspond to an extended limit for items driven by the motor while the other may correspond to a retracted limit. These signals may be provided by external limit switches, comparators coupled to potentiometers, or other devices known to those skilled in the art. The only other input signals are the comparator signals C1:C3 from the BEMF detectors or comparators as discussed above.

The input circuit 300 performs some preliminary signal manipulation before transmitting appropriate commands to the remainder of the motor controller 100. The logic supply voltage VCC is simply a DC voltage and may therefore be transmitted to the necessary devices. Similarly, the comparator signals C1:C3 are simply buffered before transmission to the Back EMF Multiplexer 305. All other digital input signals are preferably buffered at the input circuit 300 as well.

Figure 4:
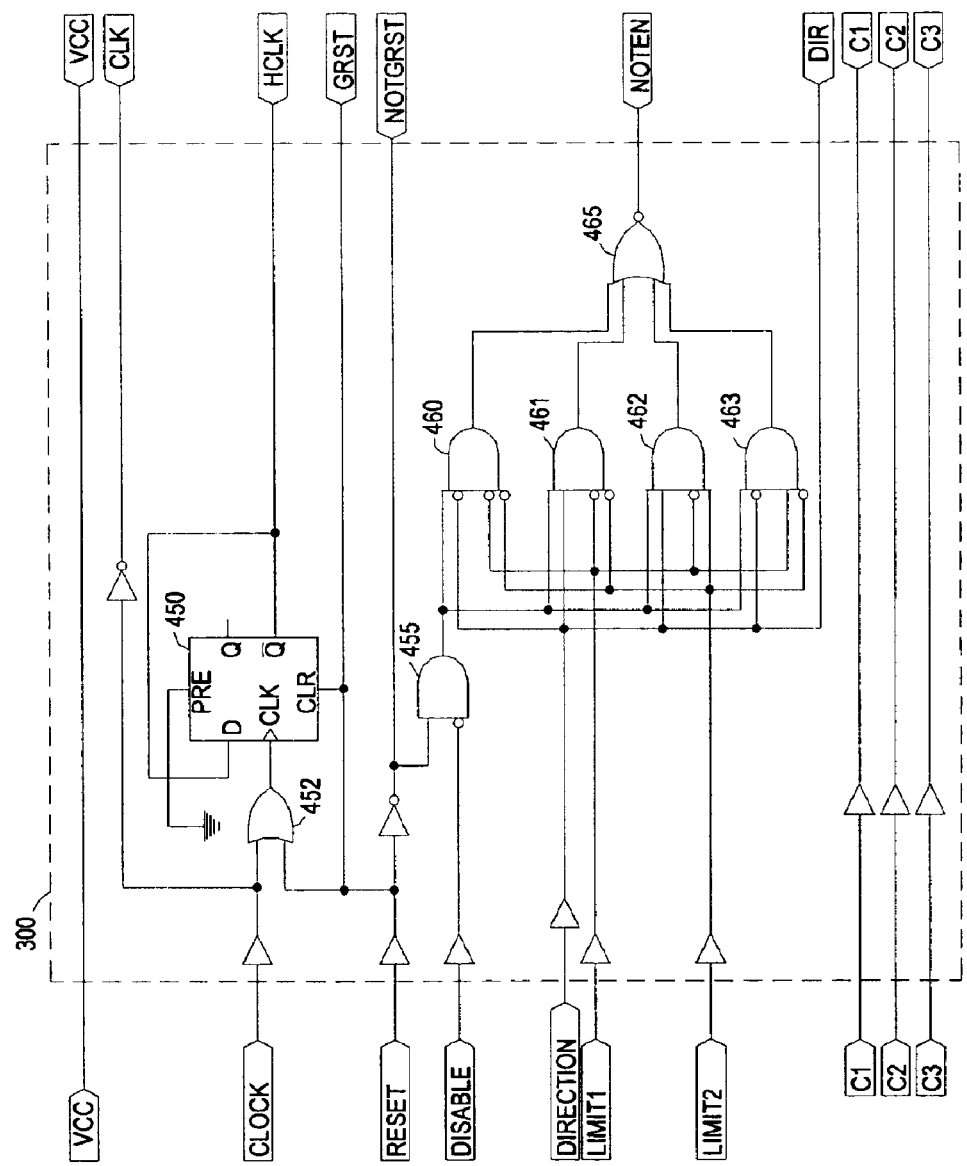
FIG. 4 shows a logic schematic of the input circuit of the preferred embodiment.

The input clock is inverted and labeled CLK in FIG. 4. Further, the frequency of the input clock is decreased by a factor of two using a rising edge flip-flop 450. The resulting half-speed clock is labeled HCLK in FIG. 4. In this frequency division process, the polarity of HCLK is inverted compared to the original CLOCK. Consequently, the input CLOCK is also inverted (CLK) to maintain clock alignment with the newly created HCLK. OR gate 452 provides the necessary setup time for flip-flop 450 when the reset command is used. However, inasmuch as the reset is rarely used, OR gate 452 may be considered nonessential.

The RESET signal is split into binary opposite copies of the original active-high, normally-low signal. Thus, the global reset signal GRST tracks the polarity of RESET and is simply the polar opposite of NOTGRST. Some logic devices are reset with a logic high input while others are reset with a logic low input. For instance, flip-flop 450 requires a logic 1 reset, so GRST is coupled to the CLR input. The GRST and NOTGRST signals may simply be forwarded as a reset signal to the appropriate devices. Note also that the DIRECTION input value is also forwarded as necessary as the DIR signal.

Figure 5:
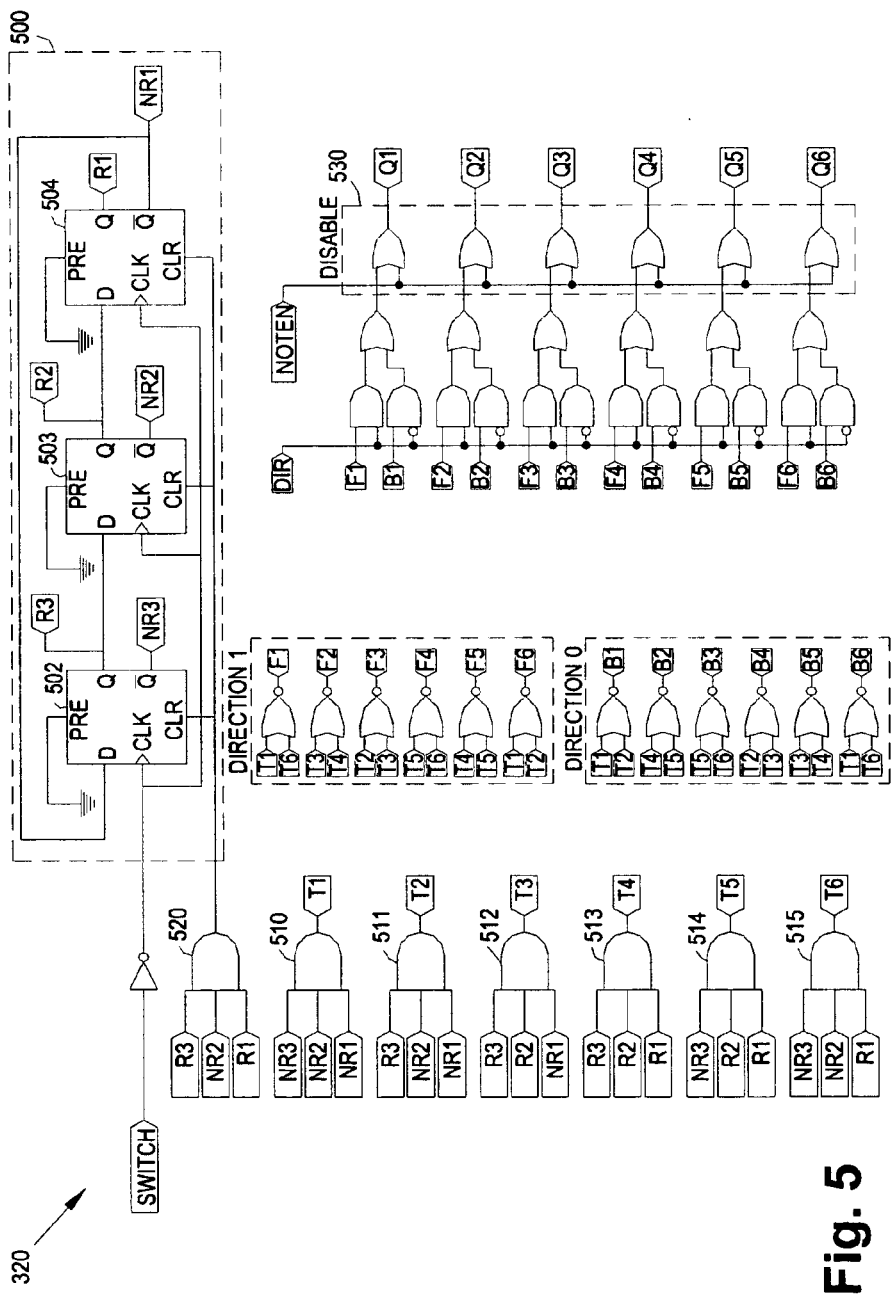
FIG. 5 shows a logic schematic of the commutational logic circuit of the preferred embodiment.

The input signals RESET, DISABLE, DIRECTION, and LIMIT1 and LIMIT2 are used to generate a global disable signal (NOTEN), which is normally low, active high. As shown in FIG. 5, a high NOTEN signal shuts off all drive switches and permits the DC motor to coast. The RESET and DISABLE signals are normally low, active-high signals. The inverse of these signals are input to AND gate 455, which will normally output a logic 1. This output and the input signals DIRECTION, LIMIT1 and LIMIT2 are each fed in various polarities to a bank of four 4-input AND gates 460–463. The outputs from these AND gates 460–463 are in turn directed to the input of a 4-input NOR gate 465. The end result of this logic is that as long as the RESET, DISABLE, LIMIT1, and LIMIT2 signals are not activated (remain logic 0), the disabling signal NOTEN will remain off (logic 0) regardless of the value of DIRECTION. However, if DIRECTION is high, NOTEN will go high when LIMIT1 goes high. Similarly, if DIRECTION is low, NOTEN will go high when LIMIT2 goes high. This portion of the input circuit 300 therefore effectively disables the DC motor when the reset or disable signals are activated, or alternatively, when the appropriate limit is reached for a given direction. Naturally, as with any logic circuit, the choice of signal polarities is somewhat arbitrary and may be altered accordingly provided the base functionality is retained.

Referring now to FIG. 5, a logic schematic of the commutational logic circuit 320 is shown. In the preferred motor controller 100, the commutational logic performs two primary functions. The first function is the state machine 500 represented by the three flip-flops 502–504. These flip-flops 502–504 are chained together to form a Johnson state machine resembling a three-position shift register. However, unlike a pure shift register, the state machine 500 also makes use of the inverted (Q-Bar) outputs from the flip-flops 502–504. The Q outputs from the flip-flops 502–504 are designated R3, R2, and R1, respectively. Similarly, the inverted Q-Bar outputs from the flip-flops 502–504 are designated NR3, NR2, and NR1, respectively. Together, the flip-flops generate six unique states that determine the current commutation state T1:T6 as represented by the digital representations shown in the second column of the state tables of FIG. 2.

As bits are shifted out of the pseudo-register, they are inverted and fed back to the input of the register. Consider, as an example, state T3 in Direction 1, which is represented by R3:R1 values of 110. A shift to state T4 requires a value of 111, which is accomplished by right shifting the first and second bits (11), inverting the third bit (0 to 1), and placing the inverted bit in the first bit position to create 111. The process is repeated and the state machine advances whenever the flip-flops are clocked by the SWITCH signal.

The three-bit digital representation provided by the state machine is preferably decoded by the bank of six 3-input AND gates 510–515. The inputs to these AND gates 510–515 come from the Q and Q-Bar outputs of flip-flops 502–504. Under normal operating conditions, only one of the AND gates 510–515 will generate a high output, thereby indicating the current state. It should be noted that an alternative embodiment may incorporate a state machine that comprises six chained flip-flops to form a true 6-position shift register. In this alternative embodiment, a single high bit may be shifted through the register with the bit position indicating the current state. However, the preferred embodiment provides a more compact implementation. Those skilled in the art will recognize other feasible implementations of the state machine.

Another item of note are the two "unused" states that are possible in the three-bit digital representation R3:R1. These two unused states are represented by the bit strings 101 and 010. The manner in which the Johnson state machine 500 is configured precludes the use of these states because the state machine would simply toggle between these states. In the configuration shown, the state machine can effectively switch through either six unique states or two unique states. Obviously, for the present task, the six-state machine is preferred. To account for the possibility that the state machine ends up in one of the two unused states, a seventh 3-input AND gate 520 is used to clear the state machine. Only one AND gate 520 is needed since the state machine would simply toggle between the two unused states and the output of this AND gate 520 would eventually clear the state machine to begin at state T1 or 000.

Referring still to FIG. 5, and having sufficiently decoded the current state T1:T6 from the state machine 500, the commutator logic proceeds to determine the proper values for the drive switch output signals Q1:Q6. The commutator logic proceeds to identify an intermediate state that can be understood by examining the state tables shown in FIGS. 2A and 2B. The goal of the commutator logic is to decode the digital representation of the current state into the output signals Q1:Q6. Given the active low presumption for the output signals Q1:Q6 stated above, the commutator logic looks to determine the states in which each output is actually low. Thus, the output signal Q1 is low in states T1 and T6 for direction 1 and also in states T1 and T2 for direction 0. Intermediate outputs F1 and B1 represent these possible combinations and correspond to output Q1. Output F1 goes low when either T1 or T6 are high. Similarly, B1 goes low when either T1 or T2 are high. The DIR signal then selects between the F1 and B1 signals and forwards their current value to the output Q1. The same logic applies to the remaining output signals Q2:Q6.

The preferred commutator logic 320 also incorporates a disabling function 530. The only time the active low intermediate signals (F1:F6 and B1:B6) will not reach the output Q1:Q6 is when the disable signal NOTEN is high (as generated by the input circuit 300). The NOTEN signal is therefore used to disable motor operation. If NOTEN is high, then all output signals will also go high, thereby turning off the active-low output signals Q1:Q6.

Figure 6:
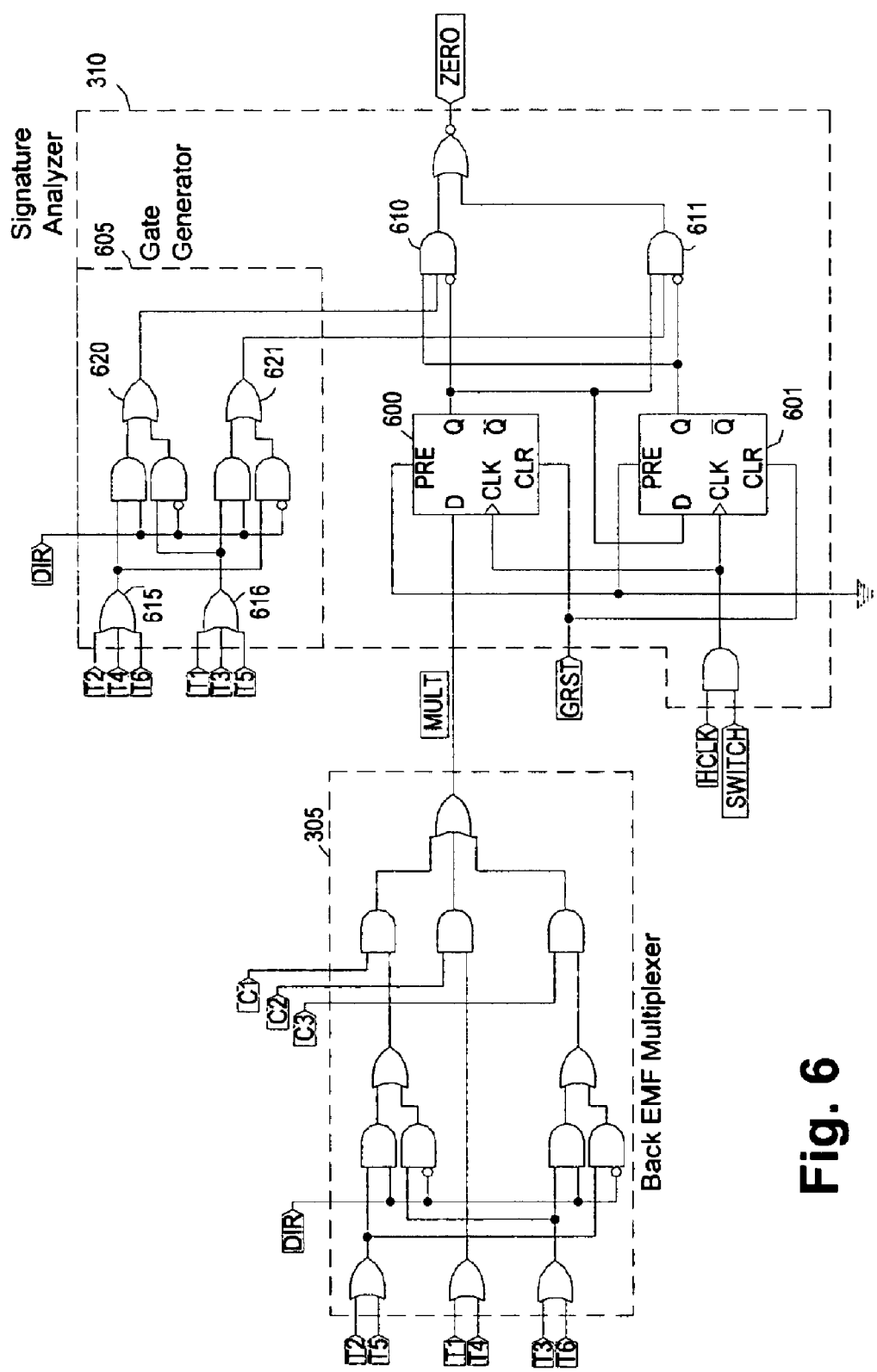
FIG. 6 shows a logic schematic of the BEMF multiplexer and signature analyzer circuits of the preferred embodiment.

Turning now to FIG. 6, a logic schematic of the Back EMF (BEMF) Multiplexer 305 and Signature Analyzer 310 circuits are shown. The BENF Multiplexer 305 operatively selects the appropriate comparator signal C1:C3 for analysis by the Signature Analyzer 310. The BEMP Multiplexer 305 completes this selection based on the current state of the system and the direction of rotor travel. As noted above, the motor windings are turned off, and the Back EMF signals monitored, during two of the six states T1:T6. As an example, consider winding 3 with the DC motor rotor traveling in direction 0. According to the state table in FIG. 2B, winding 3 should be rising in state T2 and falling in state T5. The BEMF Multiplexer will pass the C3 signal from winding 3 only when signal T2 or T5 are high and DIR is low. All remaining BEMF signals C1:C3 are similarly selected based on the current state T1:T6 and direction DIR. The output of the BEMF multiplexer 305 is transmitted to the Signal Analyzer 310 as the signal MULT.

The Signal Analyzer 310, also shown in FIG. 6, examines the MULT signal (which is really the appropriate comparator signal for the current state T1:T6) and looks for a correct zero crossing. The Signal Analyzer 310 includes a pair of chained, rising-edge-triggered flip-flops 600, 601 that, when combined with the AND gates 610, 611, can indicate when the incoming MULT signal transitions from low to high or from high to low. The upper AND gate 610 potentially indicates a high to low (falling) transition of the incoming MULT signal while the lower AND gate 611 potentially indicates a low to high. The term "potentially" is included because the outputs from the AND gates 610, 611 depend on the level of input signals generated by a gate generator 605. If the gate generator 605 does not transmit a logic high signal to either AND gate, no detected zero crossings will be delivered to the output of the Signature Analyzer 310.

The gate generator 605 groups the six possible rotor states T1:T6 into rising or falling groups. As the state tables in FIGS. 2A and 2B indicate, states T2, T4, and T6 are always exemplified by a BEMF transition of the same type. For instance, in the DIR=1 direction, the BEMF in winding 1 falls in T2, the BEMF in winding 2 falls in T4 and the BEMF in winding 3 falls in T6. Similarly, for the DIR=0 direction, the BEMF in all three windings rises in one of states T2, T4, or T6. The converse situations arise for states T1, T3, and T5. Consequently, these states are grouped accordingly using the 3-input OR gates 615, 616. The remaining logic in the gate generator 605 generates a high logic signal at OR gate 620 when the state machine is in state T2, T4, or T6 and DIR is high. Likewise, OR Gate 621 is high when T1, T3, or T5 are active and DIR is low.

Thus, OR gate 620 serves the practical effect of switching AND gate 610 on if the Signal Analyzer 310 should be expecting a falling MULT signal. By comparison, OR gate 621 is high when one of the following two scenarios is true: (1) T2, T4, or T6 are high and DIR is low or (2) T1, T3, or T5 are high and DIR is high. As with OR gate 620, OR gate 621 switches AND gate 611 on when the Signal Analyzer should be expecting a rising MULT signal. If the proper transition is detected by the flip-flops 600, 601 and the correct AND gate is turned on, the Signal Analyzer 310 generates a downward pulse in the normally-high signal ZERO. If the AND gates 610, 611 remain off, the ZERO output from the Signature Analyzer 310 remains high. The duration of the low transitions generated in the ZERO signal is governed by the time it takes the trailing flip-flop 601 to catch up to the leading flip-flop 600. During most conditions, this duration will simply be one full cycle of the clock signal HCLK.

Note, however, that the input clock HCLK to the flip-flops 600, 601 are gated by the SWITCH signal such that whenever SWITCH is low, the Signal Analyzer is essentially turned off. However, it is important to note that the SWITCH signal causes flip-flops 600 and 601 to retain or hold the last two logic levels sampled from the MULT signal. The SWITCH signal will be discussed in more detail below, but it will suffice to say here that the SWITCH signal advances the state machine 500 in the commutational logic 320. The SWITCH signal is generated by lockout timer 330 and is a normally-high, active low signal that toggles or pulses from high to low to initiate a state change. Furthermore, the SWITCH signal remains low for a period of time controlled by the lockout timer 330 and the input CLOCK frequency. The length of the lockout time allows the motor to overcome inertia and more specifically allows the rotor to generate a sufficiently detectable BEMF signal. In addition, any glitches or oscillations in the MULT signal that may result from switching between BEMF comparators 131–133 may be effectively ignored by leaving SWITCH low, thereby turning the Signature Analyzer off momentarily after a switch. These glitches may be caused by noise, poor board layout, or inadequate hysteresis.

Figure 10:
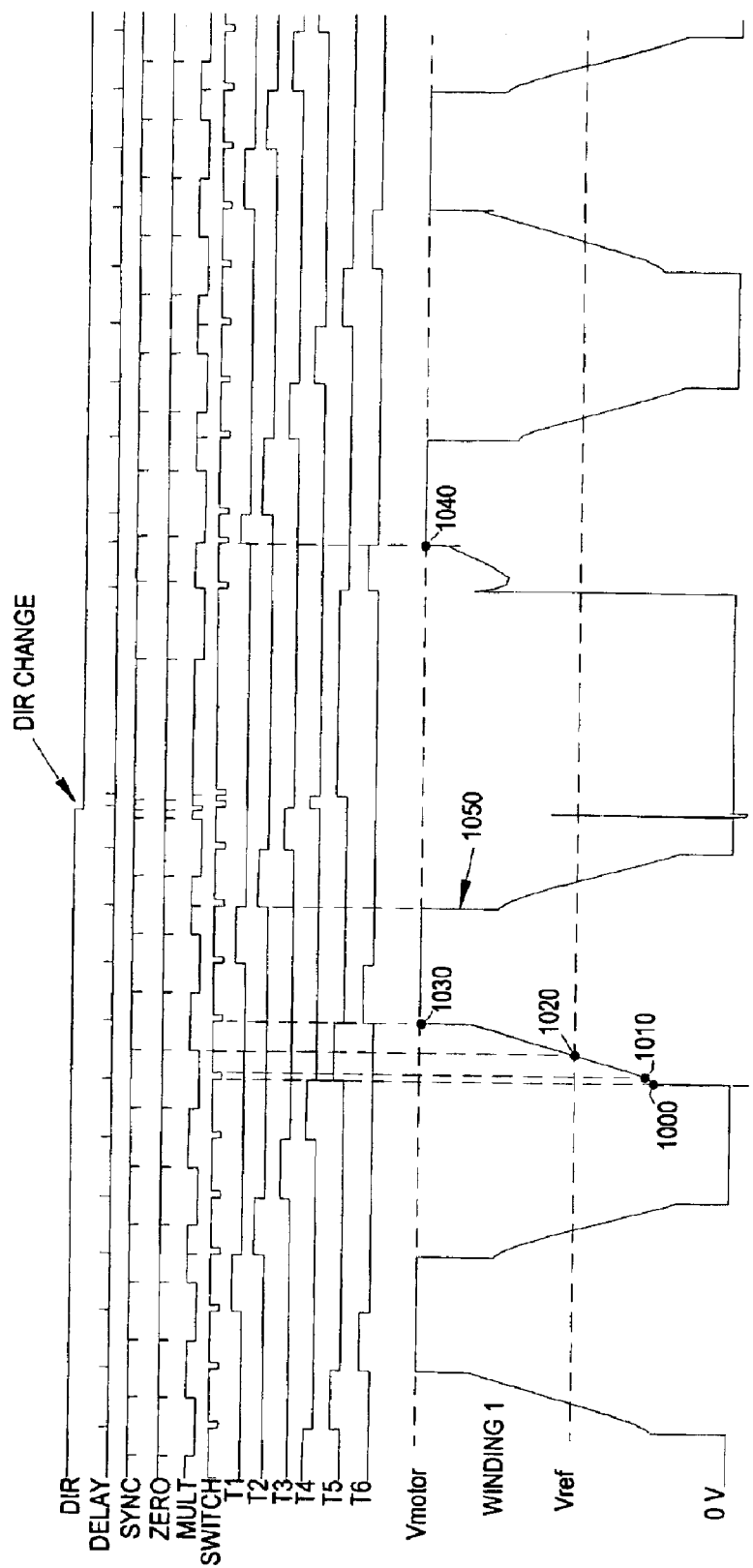
FIG. 10 shows a timing diagram of the pertinent logic signals and corresponding winding voltage in accordance with the preferred embodiment.

During steady-state operation of a DC motor using the preferred embodiment, the digital samples that are latched by the flip-flops 600, 601 before and after the SWITCH lockout time are expected to be the same. This can be further clarified by examining the motor winding W1 during state T2 and winding W3 during state T3 in FIG. 2A. Clearly, W1 is expected to be low during the last half of state T2. This is then the value latched by flip-flops 600, 601 before the SWITCH signal inhibits any further latching. Focusing on FIG. 2A waveform W3 in state T3, it is expected that the logic levels latched anytime in the first half of T3 will be low matching the previous value latched during T2. With the clock properly adjusted, the lockout time is preferably configured to end before reaching the second half of T3. When the latched values at the beginning and end of the lockout time do not match, the rotor and its commutation are out of sync. If this occurs, the Signature Analyzer 310 will produce a ZERO pulse that does not necessarily coincide with a BEMF zero crossing. This functionality provides a means of synchronizing the rotor position with the drive state. In short, the Signature Analyzer 310 provides two distinct methods of generating a ZERO pulse. One method is based on actual BEMF zero crossings when the rotor and commutation are in sync. The other method is used when the rotor and commutation are out of sync and is determined by samples of the MULT signal taken before and after the SWITCH pulse goes low. Illustrative examples of these two conditions are shown in FIG. 10 and will be discussed in more detail below.

Figure 7B:
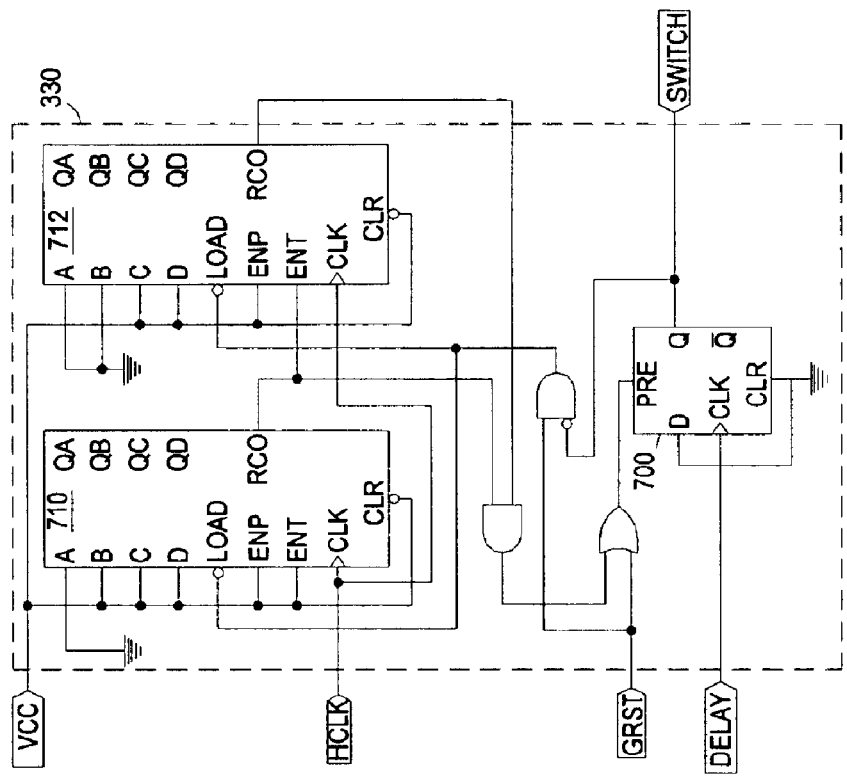
FIGS. 7A and 7B show a logic schematic of the lockout timer circuits of the preferred embodiment.
Figure 7A:
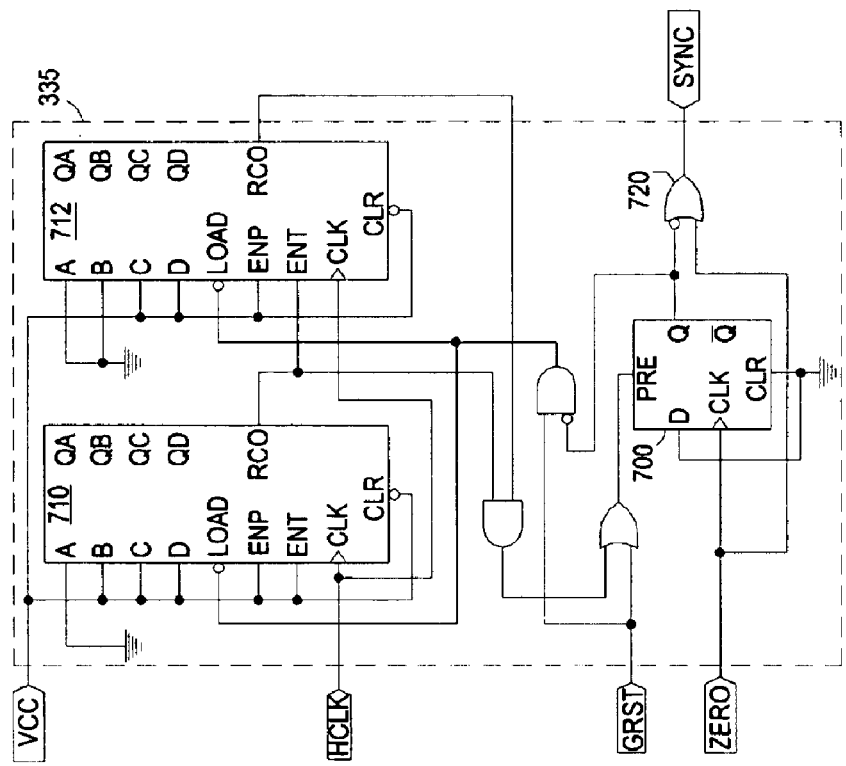

FIGS. 7A and 7B show a logic schematic of the lockout timer circuits of the preferred embodiment. The lockout timers depicted in these figures are used in different portions of the preferred motor controller 100, but their configurations are nearly identical. In each case, an input pulse triggers a flip-flop 700 to sample a low logic signal. The output Q from this flip-flop 700 remains low until the cascaded 4-bit binary counters 710, 712 count up to the value indicated by the inputs to the counters A, B, C, and D. In the preferred embodiment, the counters are configured to count $2^5$ or 32 HCLK clock cycles before pulling the flip-flop 700 back high.

The only significant difference between the lockout timers 330, 335 shown in FIGS. 7A and 7B is the inclusion of an OR gate 720 in the lockout timer 335 shown in FIG. 7A. The purpose of this OR gate 720 is to capture the initial ZERO pulse generated by the Signature Analyzer 310. After this initial pulse, the SYNC output of the OR gate 720 is held high by the output of the flip-flop 700 until the countdown time elapses. Beyond this time, the SYNC output will once again track the next ZERO pulse that appears at the input. As discussed above, comparator oscillations and glitches may result after a commutation state change or after detecting a zero crossing. Thus, the lockout timer 335 may effectively prevent or inhibit any stray pulses from propagating through the motor controller 100.

By comparison, the lockout timer 330 in FIG. 7B simply holds the SWITCH signal low following a DELAY pulse for a predetermined period of time. In the preferred embodiment, this preferred lockout time is 32 clock cycles. Other lockout times may be implemented by coupling or de-coupling input terminals A:D on counters 710, 712 to VCC or ground or by using additional, cascaded counters 710, 712. Other delay/counter devices might also be implemented.

In accordance with the preferred embodiment, after the 32 clock cycles, the SWITCH pulse returns to a high state. As with the first lockout timer 335, this second lockout timer 330 inhibits processing of false BEMF zero crossings. Furthermore, it also prevents the motor from oscillating without rotating, which may occur if the lockout time is too short. The preferred embodiment of the motor controller 100 may be adapted for use with a variety of brushless, sensorless DC motors by adjusting the input clock frequency CLOCK. Higher clock frequencies allow the controller 100 to more accurately determine switching moments. Consequently, since the lockout times are fixed at 32 clock cycles, a higher clock frequency also decreases the lockout times. In general, a short lockout time may cause the motor to oscillate or run erratically whereas a long lockout time may limit the motor speed. Experimental results have shown that a proper clock frequency may be determined with the following equation:

$$CLOCK = \frac{RPM * MPP * 392}{10},$$

where RPM represents the upper rotational speed limit of the DC motor in revolutions per minute and MPP is the number of magnetic pole-pairs in the motor. The above equation is naturally based on the preferred lockout time of 32 clock cycles. If different lockout times are selected, the optimal clock frequency will also necessarily change. The upper rotational speed is further defined to occur when Vmotor is at a maximum operating voltage and the motor load is operationally at a minimum.

Figure 8:
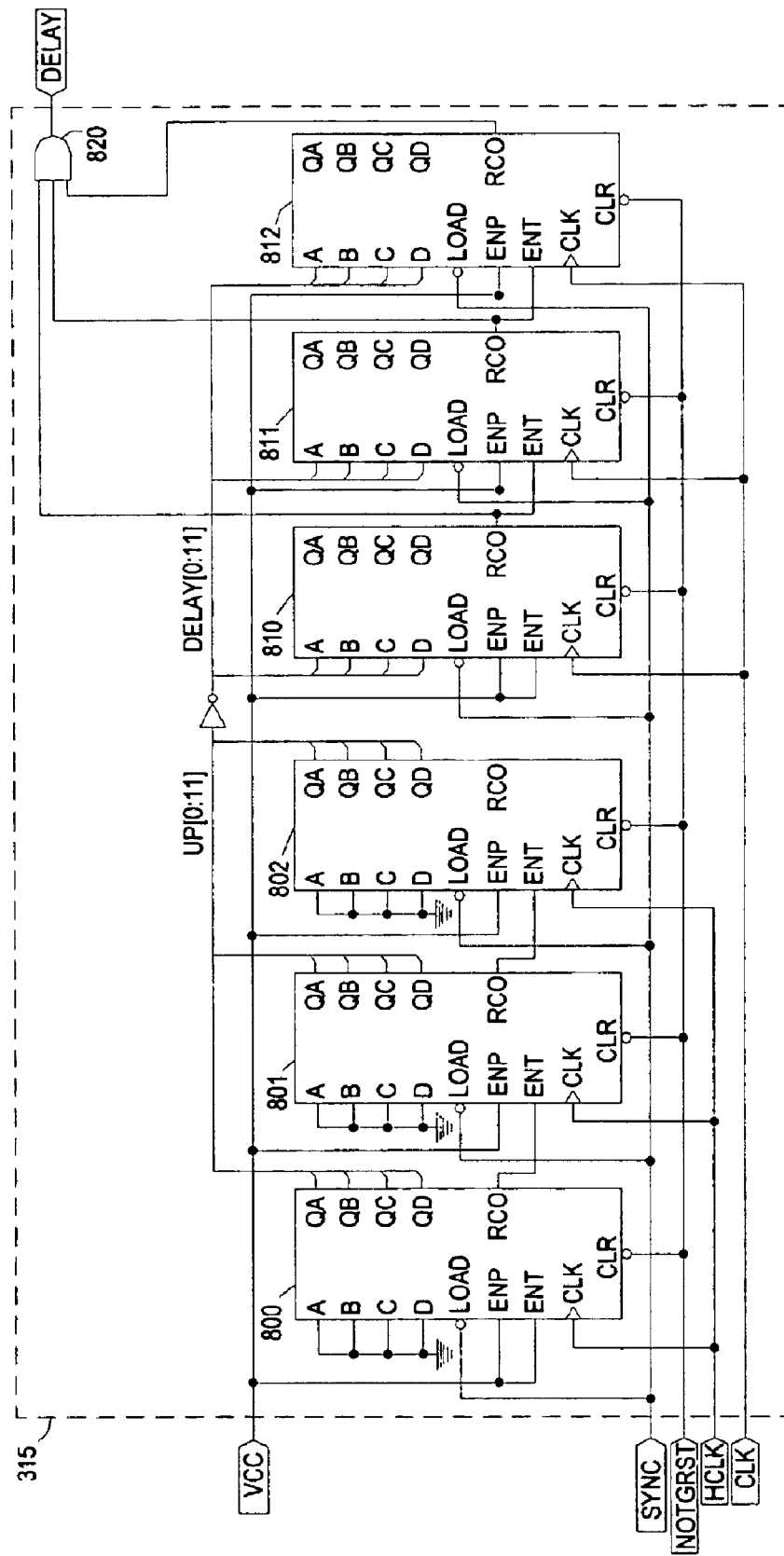
FIG. 8 shows a logic schematic of the adaptive delay and watchdog circuits of the preferred embodiment.

FIG. 8 shows a logic schematic of the Adaptive Delay and Watchdog circuit 315 of the preferred embodiment. This circuit 315 includes an Up Counter and Delay Timer sections. The terms Delay Timer and Up Counter are used herein to distinguish between separate functions of the overall circuit 315. In a preferred embodiment, both counters are implemented using the same up-counters, such as a 74HC161. The Up Counter is preferably embodied as the cascaded 4-bit binary counters 800, 801, 802. In the configuration shown, these counters 800–802 operate to count the number of HCLK clock cycles that appear between adjacent SYNC pulses. When a SYNC pulse appears at the input to the Adaptive Delay and Watchdog circuit 315, the pulse inhibits counters 801:803, 810:812 from further counting. While the SYNC signal is low, the rising edge of CLK latches the complemented content of the Up Counter 800:802 into the Delay Timer 810:812. The rising edge of HCLK then clears the counters 800:802 by causing them to load an initial input value of 0000 (Inputs A:D are grounded), after which the counters simply count up until the next SYNC pulse appears.

When the subsequent SYNC pulse appears, the binary count value reached by the counters 800:802 become stable from their respective QA:QD terminals resulting in a 12-bit representation UP[0:11] of the number of HCLK cycles counted between SYNC pulses. Each bit in this 12-bit representation is subsequently flipped to form a 1's complement. The resulting inverted 12-bit string is referred to as DELAY[0:11].

This 12-bit DELAY[0:11] string is then input to a similar cascaded string of 4-bit counters 810, 811, 812 that make up the DELAY Timer. These Delay Timer counters 810:812 are clocked by the faster CLK clock and not the slower HCLK. As discussed above, the frequency of CLK is preferably twice that of HCLK. Thus, whereas the Up Counter counts the number of cycles between adjacent SYNC pulses using the HCLK clock frequency, the DELAY Timer will count that same number of cycles using the CLK frequency. The end result is that DELAY Timer counts an equal number of cycles in half the amount of time. When the Delay Timer counters 810:812 reach FFF Hex, the ripple carry-out outputs (RCO) from all three counters 810:812 will go high, thereby causing AND gate 820 to generate a high pulse in the DELAY output signal.

To summarize, the Up Counter uses three cascaded 4-bit counters 800:802 to count the number of HCLK clock cycles appearing between adjacent SYNC pulses. The complement of this number is passed to the Delay Timer, which counts the same number of clock cycles using three cascaded 4-bit counters 810:812 clocked at the faster CLK clock frequency. When the Delay Timer has reached a maximum count the Adaptive Delay and Watchdog circuit 315 outputs a high pulse in the DELAY circuit. The practical effect of this operation is to create a lag time that is simply half the time that elapses between adjacent SYNC pulses and generate a binary opposite polarity DELAY pulse (SYNC pulses are low) that trails the SYNC pulses by this lag time. The lag time created by the Adaptive Delay and Watchdog circuit 315 is theoretically ideal because the switching time is placed halfway between zero crossings.

For all practical purposes, the DELAY pulses from the Adaptive Delay and Watchdog circuit 315 generate the switching events in the commutator logic. The DELAY signal is transmitted to the lockout timer 330 shown in FIG. 7B. However, as discussed above, the output of the lockout timer SWITCH simply toggles low in response to the incoming DELAY pulses and remains low for the designated lockout time. Consequently, during synchronized, steady-state motor operation, the DELAY and SWITCH pulses are derived from actual zero crossings and inherently adjust to changes in motor speed. Thus, the switching events are fully adaptive to changes in motor speed and input voltage.

The Adaptive Delay and Watchdog circuit 315 also incorporates a Watchdog safety measure to prevent motor burnout that may be caused by rising field currents that might occur if the switching or commutation remained stationary. Since the Adaptive Delay and Watchdog circuit 315 is triggered by SYNC pulses (which are essentially ZERO pulses), the Up Counter counters 800–802 and the Delay Timer counters 810–812 load new input values when a SYNC pulse appears. In the event the rotor is stationary, there will be no zero crossings and, hence, no SYNC pulses. However, the Delay Timer counters 810–812 will still continue to count. If these counters never load the DELAY[0:11] value, they will simply cycle through the 12-bit counter until they reach FFFh once again. At this point, the Adaptive Delay and Watchdog circuit 315 will generate a DELAY pulse that will advance the commutator state machine to induce rotor motion.

Thus, the preferred embodiment provides a number of safeguards to prevent motor damage and to initiate rotor motion during startup, reset, or a direction change. The Signature Analyzer may generate ZERO pulses even when the rotor and commutator logic are not in sync and the Watchdog circuit will also generate DELAY pulses in the event no ZERO pulses are received. Together, this functionality yields a robust startup design that accounts for and remedies non-synchronous operating conditions.

Figure 9:
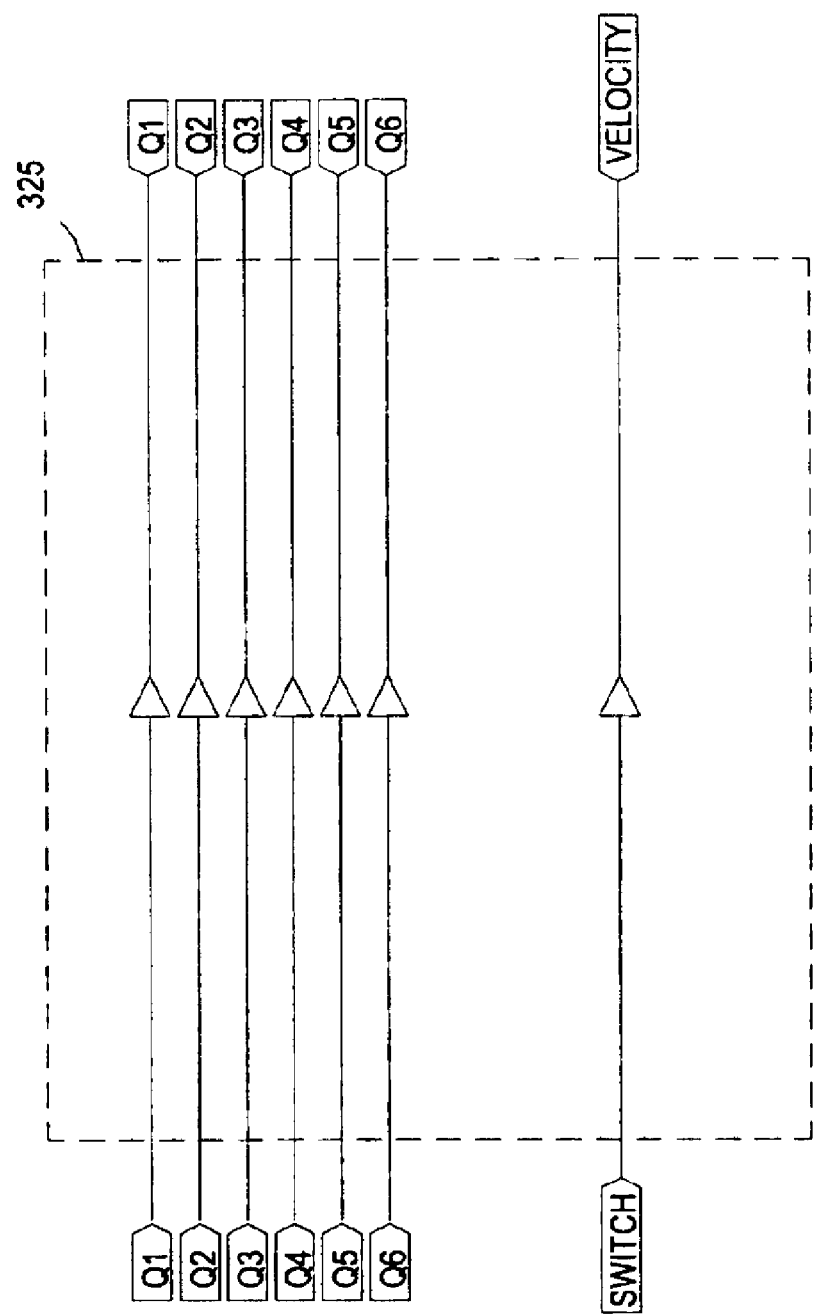
FIG. 9 shows a logic schematic of the output circuit of the preferred embodiment.

The final portion of the preferred brushless, sensorless, DC motor controller 100 is an output circuit that preferably provides the DC motor drive switch control logic signals Q1:Q6. As indicated in FIG. 9, these signals are simply buffered for delivery to the appropriate drive switches and/or level shifters as required by the actual embodiment. One additional output signal is simply the buffered SWITCH signal VELOCITY, which may be used to calculate the instantaneous velocity of the DC motor rotor. Since the Adaptive Delay and Watchdog circuit 315 actually counts clock cycles between BEMF zero crossings, this information can be used with a knowledge of the number of magnet pole-pairs (MPP) to calculate a rotational velocity. This velocity may be determined from:

$$\text{VELOCITY} = \frac{CF * 10}{MPP},$$

where VELOCITY is the rotational velocity of the rotor in revolutions per minute (RPM), MPP is the number of magnet pole-pairs in the motor, and CF is the commutation frequency as determined either by the frequency of the SWITCH signal as shown in FIG. 9, or perhaps from the UP[0:11] binary number available from the Adaptive Delay and Watchdog circuit 315. Since UP[0:11] indicates the commutation cycle time, the commutation frequency is simply the inverse of this number. Similarly, any of a variety of signals in the preferred embodiment may be used to calculate an instantaneous rotor velocity.

FIG. 10 shows a timing diagram of the pertinent logic signals and corresponding winding voltage in winding 1 in accordance with the preferred embodiment. The timing diagram includes the following signals: DIR, DELAY, SYNC, ZERO, MULT, SWITCH, and the state signals T1:T6. A few items of interest should be noted. As discussed above, the SYNC signal simply tracks the ZERO signal and during normal operating conditions, will only differ from ZERO if adjacent pulses in the ZERO signal occur before the lockout time elapses. In FIG. 10, no such pulses appear, so SYNC and ZERO are identical. Similarly, the SWITCH signal tracks the DELAY signal, but stays low for the designated lockout time.

As indicated above, when SWITCH stays low, the Signature Analyzer 310 remains off. Thus, the sampling flip-flops 600, 601 hold any value of the signal MULT that appeared at the input to the Signature Analyzer 310. In FIG. 10, this time is represented by point 1000. At point, 1010, the lockout timer elapses and the SWITCH signal returns high and the Signature Analyzer once again samples the incoming MULT signal to look for the appropriate zero crossings. At point 1010, the DC motor is operating synchronously, and thus, the MULT signal remains low (below the zero crossing) as expected. When the BEMF on the motor winding reaches Vref at point 1020, the appropriate comparator signal switches and MULT follows (low to high transition). The Signature Analyzer 310 expects this transition and therefore generates a ZERO pulse, which yields a SYNC pulse, and subsequently yields a DELAY pulse (via the Adaptive Delay and Watchdog circuit 315). This DELAY signal then produces a low SWITCH pulse, thereby producing a state change (from T5 to T6). The process then repeats to yield a T6 to T1 transition.

The timing diagram shown in FIG. 10 also shows an example of the events that occur following a change of direction. A change in direction necessarily requires a change of commutation events as the state tables in FIGS. 2A and 2B indicate. Thus, when DIR changes polarity, the rotor motion and position become out of sync with the commutation logic 320 and state machine 500. The preferred motor controller generates a sequence of SYNC and or SWITCH commands in an effort to re-synchronize the rotor with the commutation state. In the example timing diagram shown in FIG. 10, the motor and commutational logic appear to become synchronized again at or about point 1040, where T1 is active and the ZERO and SYNC pulses become evenly spaced once again.

An additional characteristic worth mentioning is the fact that BEMF voltage levels in the windings never quite reach a level as high as Vmotor nor as low as Ground. This explains the "step" function increase or decrease in voltage as the windings are pulled high/low and or released. For example, transition 1050 occurs when winding 1 is released from Vmotor during the transition from T1 to T2. It is for this reason that the winding voltage exhibits the shape shown in FIG. 10 and not the theoretical shape shown in FIGS. 2A and 2B.

Figure 11:
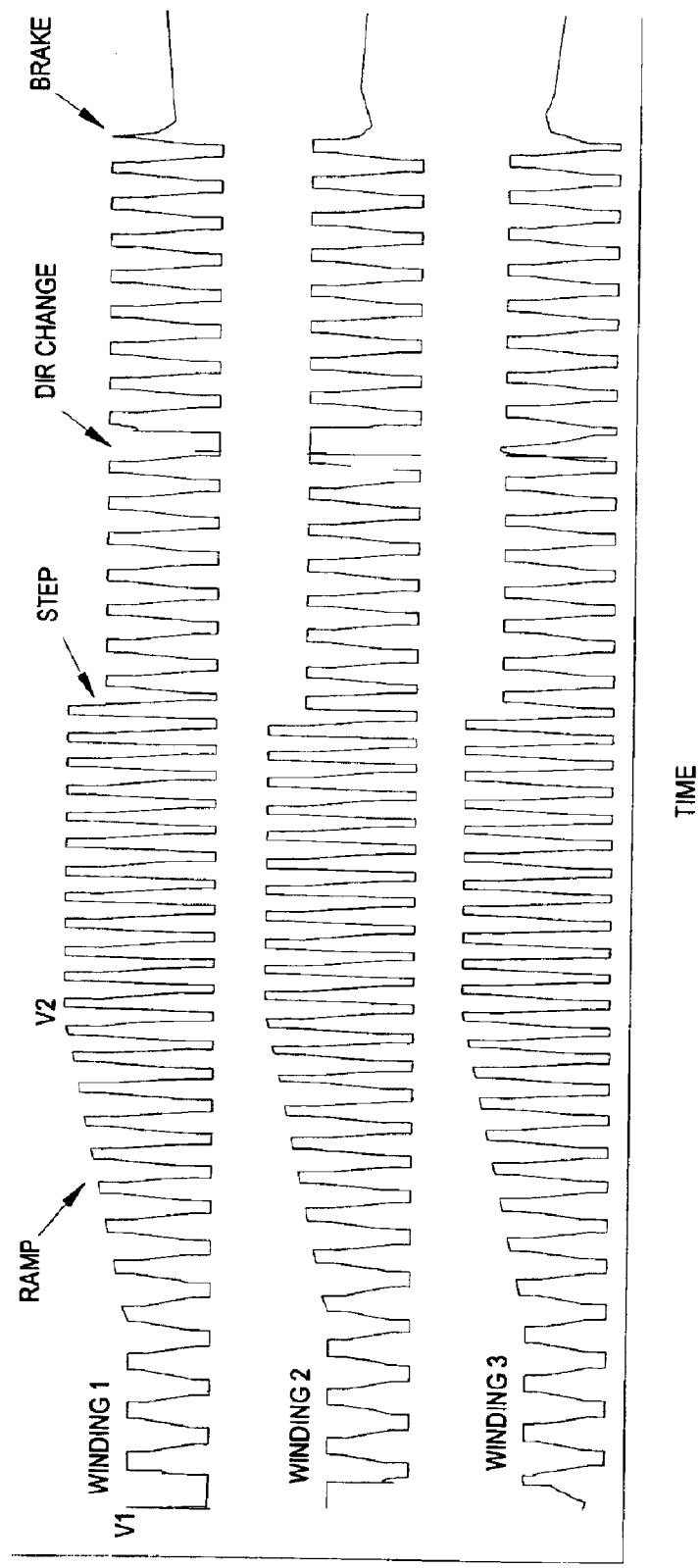
FIG. 11 shows a timing diagram indicating the winding voltage on the three windings of a brushless DC motor driven by the preferred embodiment.

FIG. 11 shows a timing diagram indicating the winding voltage on the three windings of a brushless DC motor driven by the preferred embodiment. The winding voltages in FIG. 11 show qualitatively the adaptive nature of the preferred motor controller. At the beginning of the time window shown, the motor voltage, V1, is constant and relatively low. It is easy to discern from FIG. 11 that the winding voltages lag each other by roughly 120°. After this initial, constant motor voltage segment, the input voltage is ramped up to a higher voltage, V2. The voltage on each of the windings accordingly increases. As motor voltage increases, motor velocity increases as evidenced by the tighter spacing of the commutation switching. The preferred embodiment of the motor controller 100 effectively adapts to the new rotor speed.

The preferred embodiment also adapts to step function voltage increases or decreases as shown in FIG. 11. Further, as FIG. 10 showed, a change in direction produces only a temporary glitch while the commutational logic re-synchronizes with the rotor position. Lastly, the timing diagram in FIG. 11 shows that as the DISABLE signal is activated, the BRAKE 530 effectively turns all windings off.

Accordingly, the above-described embodiments disclose a completely digital implementation of a brushless, sensorless DC motor controller. The above discussion is meant to be illustrative of the principles and various embodiments of the present invention. Numerous variations and modifications will become apparent to those skilled in the art once the above disclosure is fully appreciated. For example, as with any logic design, a variety of different embodiments may accomplish the same function. Furthermore, the above disclosed embodiments may be fully implemented on a single programmable logic device, such as a CPLD or FPGA similar to those available by Xilinx and Altera.

Figure 12:
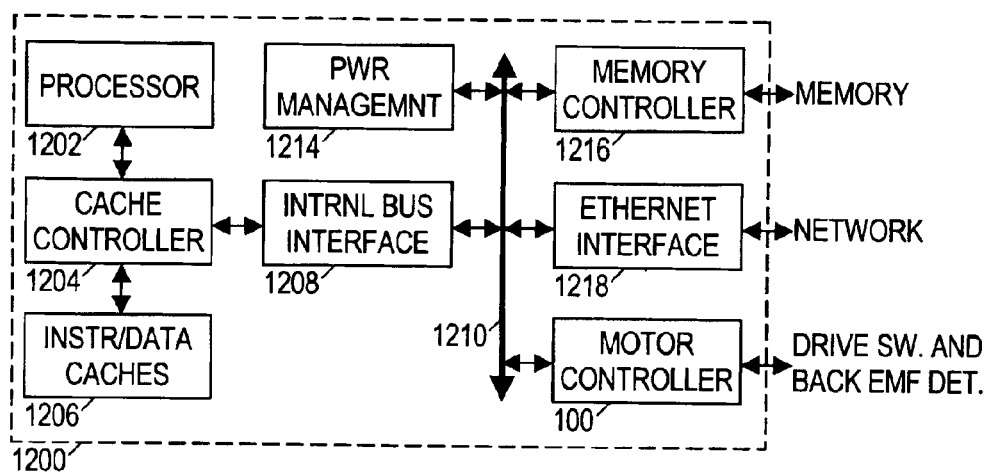
FIG. 12 shows a brushless DC motor controller embodied as an integrated peripheral in an illustrative microcontroller.

FIG. 12 shows a brushless DC motor controller 100 embodied as an integrated peripheral in an illustrative microcontroller 1200. Microcontroller 1200 includes a processor core 1202, a cache controller 1204, one or more caches 1206, an internal bus interface 1208, an internal bus 1210, a power management unit 1214, a memory controller 1216, a network interface 1218, and motor controller 100.

The processor core 1202 operates on data in accordance with stored instructions. The data and instructions are retrieved by cache controller 1204 and supplied to processor core 1202. Cache controller 1204 may cache the data and instructions in accordance with a predetermined cache algorithm to minimize processor wait time. The instructions may be stored in a separate memory along with data. The data and/or the instructions may additionally or alternatively retrieved from other sources. Cache controller 1204 accesses on-chip peripherals and off-chip components via internal bus interface 1208 and internal bus 1210.

Microcontroller 1200 may include a variety of peripherals to customize microcontroller 1200 to particular applications. The illustrative embodiment of FIG. 12 includes a power management unit 1214 which may be configured to adjust the clock rate to reduce power consumption during periods of reduced computing demand. Also included is a memory controller 1216 which may be configured to interface with external memory chips using an appropriate control protocol. A network interface 1218 (such as, e.g., an Ethernet interface) may be included to allow microcontroller 1200 to support communications with a network. Significantly, one or more brushless DC motor controllers 100 may also be included as on-chip peripherals to allow microcontroller 1200 to control operation of a brushless DC motor without introducing an undue computational load on processor core 1202. Controller 100 may include one or more registers to which processor core 1202 can write parameters (such as speed and direction) to control the operation of controller 100. Controller 100 may be coupled to external drive switches and back EMF detectors, which are in turn coupled to the windings of the brushless DC motor to be controlled.

Though shown in the form of a microcontroller peripheral in FIG. 12, brushless DC motor controller 100 may alternatively be incorporated as integrated support circuitry to other integrated electronic devices including without limitation microprocessors and digital signal processors. In yet another embodiment, brushless DC motor controller 100 may be incorporated as a discrete component (e.g., on an expansion card) in a larger system such as, e.g., a desktop computer.

While a preferred embodiment of the invention has been shown and described, modifications thereof can be made by one skilled in the art without departing from the spirit of the invention. It is intended that the following claims be interpreted to embrace all such variations and modifications.

What is claimed is:

1. An electrical motor that comprises:
    a rotor having multiple magnetic poles;
    a stator having multiple windings configurable to exert a torque on the rotor when energized in a commutational sequence; and
    a semiconductor on insulator (SOI) application-specific integrated circuit (ASIC) coupled to the windings of the stator and configured to apply the commutational sequence,
    wherein the SOI ASIC is configured to receive signals indicative of back EMF polarity on undriven windings of the stator to perform directional zero crossing detection, wherein the SOI ASIC determines the commutational sequence based on those zero crossings that only occur in anticipated directions, and
    wherein the SOI ASIC includes one or more limit inputs configured to halt advancement of the commutational sequence in a predetermined direction.

2. The motor of claim 1, wherein the SOI ASIC further includes a direction input to indicate whether the commutational sequence should be advance in a forward or reverse direction when a commutation event occurs.

3. A brushless DC motor controller that comprises:
   a set of comparators each configured to determine a voltage polarity on a respective winding of a stator; and
   a clocked digital circuit configured to receive polarity signals from the comparators, configured to detect in the polarity signals zero crossings having expected crossing directions, and configured to determine a commutational sequence for energizing windings on the stator based at least in part on zero crossings, but only those zero crossings having the expected crossing directions,
   wherein the clocked digital circuit samples a polarity signal before a lockout period and compares the sample to the polarity signal after the lockout ends, and wherein the clocked digital circuit generates a zero crossing indication if the sample does not match the polarity signal after the lockout ends.

4. A brushless DC motor controller that comprises:
   a set of comparators each configured to determine a voltage polarity on a respective winding of a stator; and
   a clocked digital circuit configured to receive polarity signals from the comparators, configured to detect in the polarity signals zero crossing having expected crossing directions, and configured to determine a commutational sequence for energizing windings on the stator based at least in part on zero crossings, but only those zero crossings having the expected crossing directions, wherein the clocked digital circuit includes:
      a first counter configured to count a number of cycles of a clock signal between detected zero crossings of the polarity signals; and
      a second counter configured to receive a count from the first counter and to count down from said count at approximately twice the rate of the clock signal, and
   wherein the clocked digital circuit is configured to advance the commutational sequence when the second counter rolls over.

5. A brushless DC motor controller that comprises:
   a set of comparators each configured to determine a voltage polarity on a respective winding of a stator; and
   a clocked digital circuit configured to receive polarity signals from the comparators, configured to detect in the polarity signals zero crossings having expected crossing directions, and configured to determine a commutational sequence for energizing windings on the stator based at least in part on zero crossings, but only those zero crossings having the expected crossing directions,
   wherein the clocked digital circuit accepts one or more limit inputs and is configured to inhibit advancement of the commutational sequence in a direction associated with the limit signal.

6. A method of driving windings in a DC motor, the method comprising:
   receiving with a clocked digital circuit, polarity signals indicative of whether voltages on windings of the DC motor exceed a threshold voltage, wherein the clocked digital circuit is configured to operate in temperatures exceeding 150° C.;
   measuring intervals between transitions of the polarity signals in predicted directions; and
   advancing a commutation state at a delay of some fraction of measured intervals after transitions of the polarity signals.

7. The method of claim 6, wherein said fraction is approximately one half, and wherein the measured intervals used to determine the delay are the intervals measured immediately preceding each advancement of the commutation state.

8. The method of claim 6, wherein the clocked digital circuit comprises semiconductor on insulator (SOI) circuitry.

9. The method of claim 6, further comprising:
   receiving with the clocked digital circuit a direction signal indicative of a desired motor direction, and one or more limit signals each associated with a respective motor direction; and
   inhibiting advancement of the commutation state if a limit signal that is associated with a direction indicated by the direction signal is asserted.

10. The method of claim 6, wherein said measuring intervals is performed with a counter operating at a first clock rate, and wherein said delay is determined by a second counter operating at a second clock rate that is greater than the first.

11. The method of claim 10, wherein said advancing a commutation state occurs when the second counter rolls over.

12. An integrated device that comprises:
    a processor core; and
    an integrated motor controller coupled to the processor core by an internal bus,
    wherein the integrated motor controller is configured to receive signals indicative of back EMF polarity on undriven windings of a DC motor to perform directional zero crossing detection, wherein the integrated motor controller determines a commutational sequence based on those zero crossings that only occur in anticipated directions, and
    wherein the integrated motor controller includes one or more limit inputs configured to halt advancement of a commutational sequence in a predetermined direction.

13. The device of claim 12, wherein the integrated motor controller further includes a direction input to indicate whether the commutational sequence should be advance in a forward or reverse direction when a commutation event occurs.

14. The method of claim 6, wherein the clocked digital circuit is implemented in a single programmable logic device.

* * * * *